(12) United States Patent
Sakamoto

(10) Patent No.: US 11,760,133 B2
(45) Date of Patent: Sep. 19, 2023

(54) PNEUMATIC TIRE

(71) Applicant: The Yokohama Rubber Co., LTD., Tokyo (JP)

(72) Inventor: Yousuke Sakamoto, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 328 days.

(21) Appl. No.: 16/968,553

(22) PCT Filed: Dec. 27, 2018

(86) PCT No.: PCT/JP2018/048198
§ 371 (c)(1),
(2) Date: Aug. 7, 2020

(87) PCT Pub. No.: WO2019/155786
PCT Pub. Date: Aug. 15, 2019

(65) Prior Publication Data
US 2020/0369090 A1 Nov. 26, 2020

(30) Foreign Application Priority Data
Feb. 9, 2018 (JP) ................................. 2018-022231

(51) Int. Cl.
*B60C 11/03* (2006.01)
*B60C 11/11* (2006.01)
*B60C 11/13* (2006.01)

(52) U.S. Cl.
CPC .......... *B60C 11/0306* (2013.01); *B60C 11/13* (2013.01); *B60C 11/11* (2013.01);
(Continued)

(58) Field of Classification Search
CPC ......... B60C 2011/1361; B60C 11/0302; B60C 2011/0383; B60C 2011/0374;
(Continued)

(56) References Cited

U.S. PATENT DOCUMENTS

2007/0215258 A1 9/2007 Fukunaga
2009/0194213 A1* 8/2009 Suzuki .................. B60C 11/047
152/209.24
(Continued)

FOREIGN PATENT DOCUMENTS

CN 204451858 7/2015
CN 106660408 5/2017
(Continued)

OTHER PUBLICATIONS

International Search Report for International Application No. PCT/JP2018/048198 dated Apr. 2, 2019, 4 pages, Japan.

*Primary Examiner* — Cedrick S Williams
*Assistant Examiner* — Thomas Frank Schneider
(74) *Attorney, Agent, or Firm* — Thorpe North & Western

(57) ABSTRACT

A pneumatic tire includes shoulder lands and a center land, defined by main grooves on both sides of an equator in a zigzag pattern along a circumferential direction, are defined in a tread. Shoulder lug grooves extending in a width direction are formed in each of the shoulder lands. First and second center lug grooves, which extend from the shoulder lug grooves across each of the main grooves and are inclined at an angle of 45°-70° with respect to the width direction, are disposed in the center land. The first center lug groove terminates at the equator, and the second center lug groove terminates without reaching the equator. The first and second center lug grooves are alternately disposed in the circumferential direction. Connecting grooves inclined in an opposite direction to an inclination direction of the center lug grooves to connect the center lug grooves are formed in the center land.

8 Claims, 4 Drawing Sheets

(52) U.S. Cl.
CPC ............... *B60C 2011/0346* (2013.01); *B60C 2011/0353* (2013.01); *B60C 2011/0355* (2013.01); *B60C 2011/0372* (2013.01); *B60C 2011/0381* (2013.01); *B60C 2011/0383* (2013.01); *B60C 2011/1361* (2013.01)

(58) Field of Classification Search
CPC ......... B60C 2011/0381; B60C 11/0306; B60C 11/04; B60C 11/11; B60C 11/13; B60C 2200/04
See application file for complete search history.

(56) References Cited

U.S. PATENT DOCUMENTS

| | | | |
|---|---|---|---|
| 2009/0199943 A1* | 8/2009 | Boiocchi | B60C 11/0302 |
| | | | 152/209.8 |
| 2011/0048601 A1 | 3/2011 | Fukunaga | |
| 2013/0139936 A1 | 6/2013 | Ohara | |
| 2015/0343847 A1 | 12/2015 | Niwa | |
| 2016/0243899 A1* | 8/2016 | Miyoshi | B60C 11/0332 |
| 2017/0217256 A1 | 8/2017 | Hamanaka et al. | |
| 2018/0001713 A1 | 1/2018 | Fujioka | |

FOREIGN PATENT DOCUMENTS

| | | | | |
|---|---|---|---|---|
| CN | 107554200 | | 1/2018 | |
| DE | 10311430 A1 | * | 9/2004 | ......... B60C 11/0302 |
| JP | 2005-153654 | | 6/2005 | |
| JP | 2013-119277 | | 6/2013 | |
| JP | 2015-081076 | | 4/2015 | |
| JP | 2016-007861 | | 1/2016 | |
| JP | 2016-147656 | | 8/2016 | |
| JP | 2017-128217 | | 7/2017 | |
| WO | WO 2005/115770 | | 12/2005 | |
| WO | WO 2014/103643 | | 7/2014 | |
| WO | WO 2015/059942 | | 4/2015 | |
| WO | WO 2015/108080 | | 7/2015 | |
| WO | WO 2016/013600 | | 1/2016 | |

* cited by examiner

PNEUMATIC TIRE

TECHNICAL FIELD

The present technology relates to a pneumatic tire suitable as a tire for driving on unpaved roads and, more particularly, to a pneumatic tire that provides improved noise performance and driving performance on unpaved roads.

BACKGROUND ART

As a pneumatic tire used for driving on unpaved roads such as an uneven ground surface, a muddy ground surface, a snowy road, a sandy ground surface, and a rocky ground surface, a tire including a tread pattern, which mainly includes lug grooves or blocks having a large number of edge components and has a large groove area, is generally adopted. Such a tire achieves traction performance by biting mud, snow, sand, stones, rocks, or the like on a road surface (hereinafter, referred to collectively as "mud or the like") and prevents grooves from being clogged with mud or the like, and thus provides improved driving performance on unpaved roads (for example, see Japan Unexamined Patent Publication Nos. 2016-007861 and 2013-119277).

When comparing the tires of Japan Unexamined Patent Publication Nos. 2016-007861 and 2013-119277, the tire of Japan Unexamined Patent Publication No. 2016-007861 is a type of tire that has a relatively small groove area and is designed in consideration of driving performance on paved roads as well. On the other hand, the tire of Japan Unexamined Patent Publication No. 2013-119277 is a type of tire that has a large groove area and large blocks, and is designed particularly in consideration of driving performance on unpaved roads. As a result, the former has inferior driving performance on unpaved roads to that of the latter, and the latter tends to have inferior performance at the time of normal driving to that of the former. In recent years, performance requirements for tires have become diverse, and tires for driving on unpaved roads, which have the intermediate level of performance between such two types of tires, have been demanded. In addition, solutions have been demanded to efficiently enhance driving performance on unpaved roads with a suitable groove shape. Moreover, as described above, basically, the tires for driving on unpaved roads mainly include blocks and has a large groove area, and thus noise performance (for example, pattern noise) tends to easily decrease. As a result, the noise performance is also required to be maintained stably or improved.

SUMMARY

The present technology provides a pneumatic tire that provides improved noise performance and driving performance on unpaved roads.

A pneumatic tire according to an embodiment of the present technology includes: a tread portion extending in a tire circumferential direction and having an annular shape; a pair of sidewall portions disposed on both sides of the tread portion; and a pair of bead portions disposed inward of the sidewall portions in a tire radial direction. The tread portion includes: a pair of main grooves extending on both sides of a tire equator in a zigzag pattern along the tire circumferential direction; a center land portion defined on the tire equator by the pair of main grooves; and shoulder land portions defined outward of the pair of main grooves in the tire width direction. Shoulder lug grooves extending in the tire width direction are formed in each of the shoulder land portions. Center lug grooves continuously extending from the shoulder lug grooves across each of the main grooves and inclined at an angle of 45° or greater and 70° or smaller with respect to the tire width direction are formed in the center land portion. The center lug grooves include: a first center lug groove that reaches the tire equator to be terminated thereat; and a second center lug groove that is terminated without reaching the tire equator. The first center lug groove and the second center lug groove are alternately disposed in the tire circumferential direction. Connecting grooves inclined in an opposite direction to an inclination direction of the center lug grooves to connect the center lug grooves are formed in the center land portion.

In an embodiment of the present technology, since the shoulder lug grooves and the center lug grooves (the first center lug groove and the second center lug groove) are disposed as described above, the grooves function as groups of a series of grooves continuously extending across the land portion between each of the shoulder land portions, which are defined on opposite sides of the main grooves extending in a zigzag pattern, and the center land portion. Further, the connecting grooves inclined in the opposite direction to the center lug grooves connect the center lug grooves and thus complicate the configuration of the grooves in the center land portion. As a result, excellent traction performance and drainage performance on unpaved roads can be exerted. On the other hand, the center lug grooves are formed of two types of the first center lug groove and the second center lug groove having different termination positions. Additionally, as described above, the configuration of the grooves in the center land portion is complicated, and thus pattern noise peaks are dispersed, which makes it possible to reduce noise.

In an embodiment of the present technology, a groove depth of the center lug grooves is preferably smaller than a groove depth of the shoulder lug grooves. As a result, the balance between the groove volume and the block rigidity in the entire tread portion is improved, which is advantageous to improve driving performance on unpaved roads.

In an embodiment of the present technology, a groove depth of the connecting grooves is preferably smaller than a groove depth of the center lug grooves. As a result, the balance between the groove volume and the block rigidity in the center land portion is improved, which is advantageous to improve driving performance on unpaved roads.

In an embodiment of the present technology, widths of the shoulder lug grooves and the center lug grooves are preferably from 50% to 100% of a width of the main grooves. As a result, the balance between the groove volume and the block rigidity in the entire tread portion is improved, which is advantageous to improve driving performance on unpaved roads.

In an embodiment of the present technology, a terminating end portion of each of the center lug grooves preferably has an acute angle shape. As a result, the end shape of the center lug groove is improved, which is advantageous for reducing noise. In addition, the terminating end portion of the center lug groove is tapered, and thus the block rigidity can be ensured, which makes it advantageous to improve driving performance on unpaved roads.

In an embodiment of the present technology, preferably, protrusion portions are each disposed at a bottom of the first center lug groove. The protrusion portion protrudes from the bottom of the first center lug groove and extends along the first center lug groove. The protrusion portions are provided as just described, and thus stone biting for the center lug grooves can be prevented. As a result, driving performance on unpaved roads is advantageously enhanced.

In an embodiment of the present technology, "tire ground contact edge" is either end portion in a ground contact region in the tire axial direction, which is formed when a regular load is applied to the tire in a state where the tire mounted on a regular rim and inflated to a regular internal pressure is placed vertically on a flat surface. "Regular rim" is a rim defined by a standard for each tire according to a system of standards that includes standards on which tires are based, and refers to a "standard rim" in the case of JATMA (The Japan Automobile Tyre Manufacturers Association, Inc.), refers to a "design rim" in the case of TRA (The Tire and Rim Association, Inc.), and refers to a "measuring rim" in the case of ETRTO. In the system of standards, including standards with which tires comply, "regular internal pressure" is air pressure defined by each of the standards for each tire and is referred to as "maximum air pressure" in the case of JATMA, the maximum value being listed in the table "TIRE ROAD LIMITS AT VARIOUS COLD INFLATION PRESSURES" in the case of TRA, and is "INFLATION PRESSURE" in the case of ETRTO. However, "regular internal pressure" is 180 kPa in a case where a tire is a tire for a passenger vehicle. "Regular load" is a load defined by a standard for each tire according to a system of standards that includes standards on which tires are based, and refers to a "maximum load capacity" in the case of JATMA, refers to the maximum value in the table of "TIRE ROAD LIMITS AT VARIOUS COLD INFLATION PRESSURES" in the case of TRA, and refers to "LOAD CAPACITY" in the case of ETRTO. "Regular load" corresponds to 88% of the loads described above for a tire on a passenger vehicle.

DETAILED DESCRIPTION

Configurations of embodiments of the present technology will be described in detail below with reference to the accompanying drawings.

Figure 1:
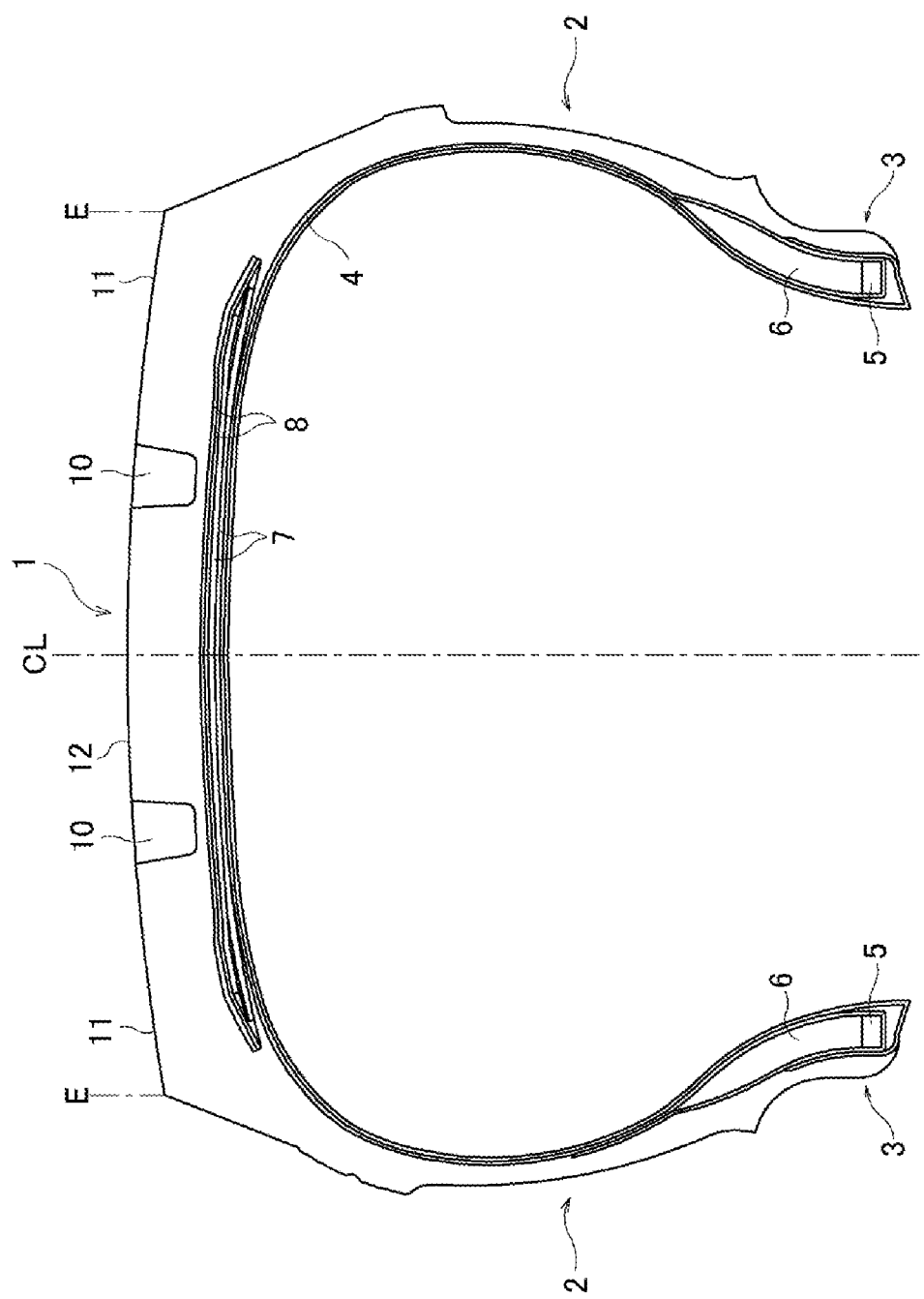
FIG. 1 is a meridian cross-sectional view of a pneumatic tire according to an embodiment of the present technology.

As illustrated in FIG. 1, a pneumatic tire according to an embodiment of the present technology includes a tread portion 1, a pair of sidewall portions 2 disposed on both sides of the tread portion 1, and a pair of bead portions 3 disposed inward of the sidewall portions 2 in the tire radial direction. In FIG. 1, reference sign CL denotes a tire equator, and reference sign E denotes a ground contact edge. Additionally, FIG. 1 is a meridian cross-sectional view, and accordingly, although not illustrated, each of the tread portion 1, the sidewall portion 2, and the bead portions 3 extends in the tire circumferential direction to form an annular shape. Thus, the basic structure of the toroidal shape of the pneumatic tire is configured. The description using FIG. 1 is basically based on the illustrated meridian cross-sectional shape; however, each of the tire components extends in the tire circumferential direction to form an annular shape.

A carcass layer 4 is mounted between the left-right pair of bead portions 3. The carcass layer 4 includes a plurality of reinforcing cords extending in the tire radial direction, and is folded back around a bead core 5 disposed in each of the bead portions 3 from a vehicle inner side to a vehicle outer side. Additionally, bead fillers 6 are disposed on the periphery of the bead cores 5, and each bead filler 6 is enveloped by a main body portion and a folded back portion of the carcass layer 4. On the other hand, in the tread portion 1, a plurality of belt layers 7 (two layers in FIG. 1) are embedded on an outer circumferential side of the carcass layer 4. The belt layers 7 each include a plurality of reinforcing cords that are inclined with respect to the tire circumferential direction, with the reinforcing cords of the different layers arranged in a criss-cross manner. In these belt layers 7, the inclination angle of the reinforcing cords with respect to the tire circumferential direction ranges from, for example, 10° to 40°. In addition, a belt reinforcing layer 8 is provided on the outer circumferential side of the belt layers 7. The belt reinforcing layer 8 includes organic fiber cords oriented in the tire circumferential direction. In the belt reinforcing layer 8, the angle of the organic fiber cords with respect to the tire circumferential direction is set, for example, to from 0° to 5°.

The present technology may be applied to such a pneumatic tire having a general cross-sectional structure; however, the basic structure is not limited to the aforementioned structure.

Figure 2:
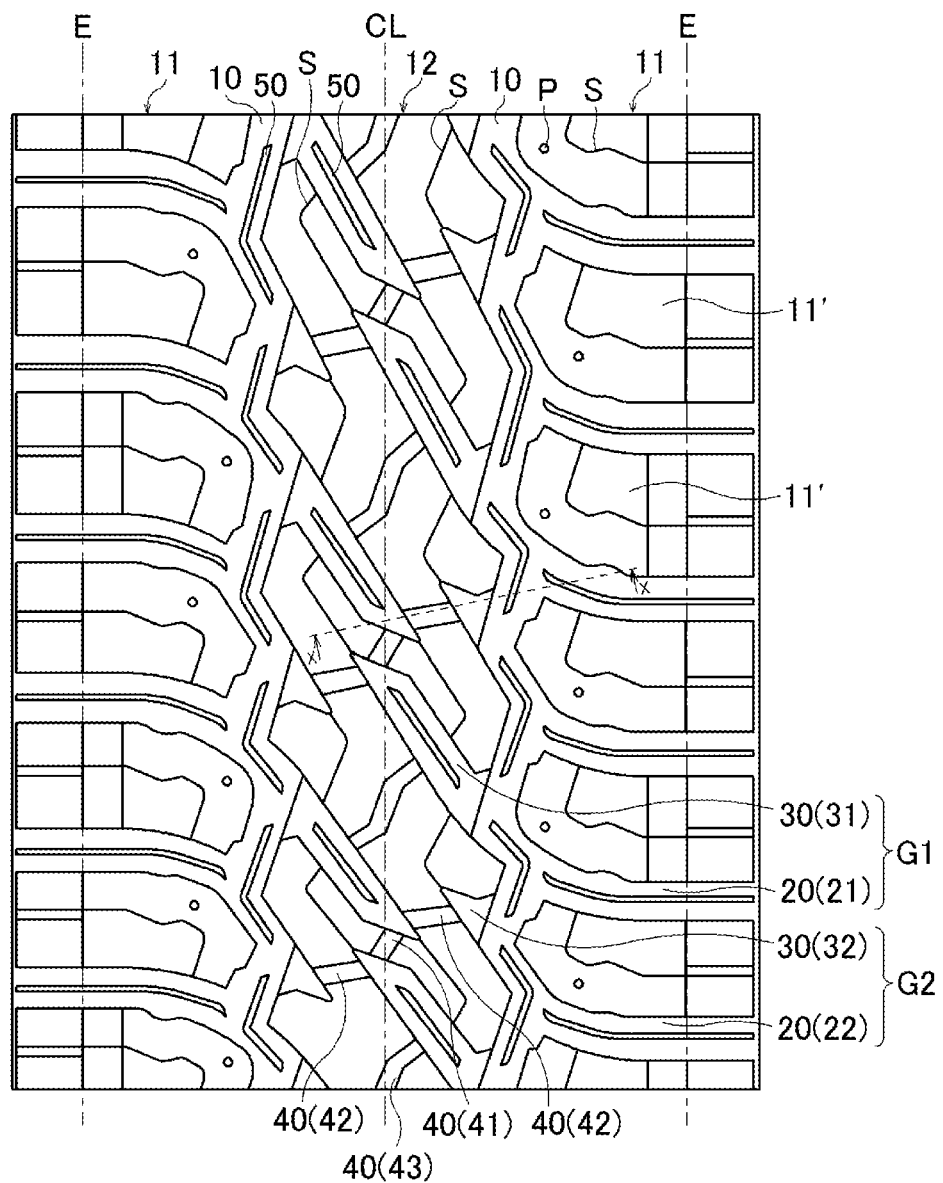
FIG. 2 is a front view illustrating a tread surface of a pneumatic tire according to an embodiment of the present technology.

As illustrated in FIG. 2, a pair of main grooves 10 extending in a zigzag pattern along the tire circumferential direction are formed on both sides of the tire equator CL in a surface of the tread portion 1 of the pneumatic tire according to an embodiment of the present technology. As in the illustrated example, extending in a zigzag pattern means that a portion linearly extended in a certain direction and a portion linearly extended in a direction different from the direction of the former portion are repeatedly alternated to form a repeatedly bent shape along the tire circumferential direction. The main groove 10 has a groove width of, for example, from 12 mm to 22 mm and a groove depth of, for example, from 12 mm to 18 mm. Note that the groove width and groove depth of the main groove 10 are values measured in the aforementioned linearly extended portions.

Figure 3:
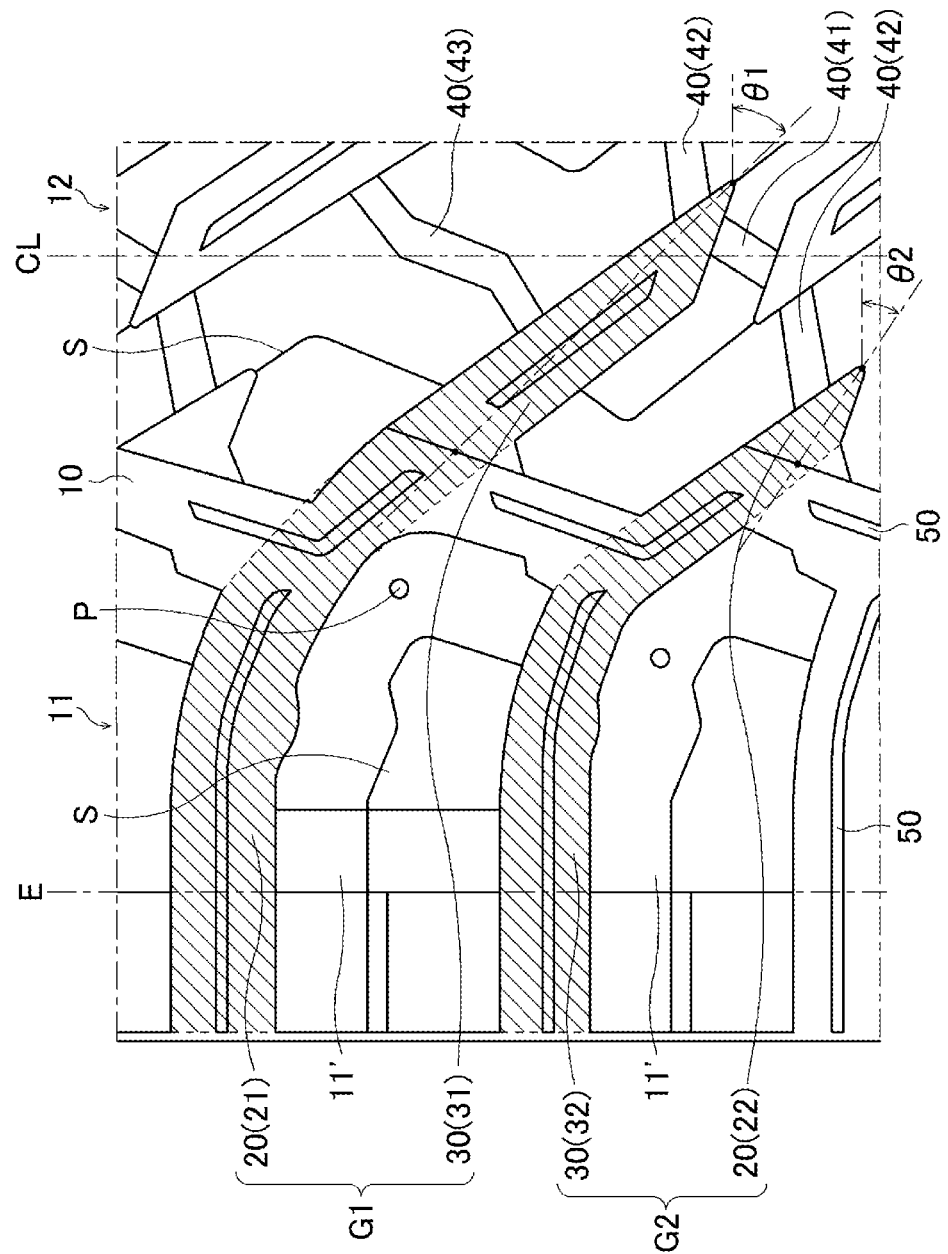
FIG. 3 is an enlarged explanatory diagram illustrating shoulder lug grooves and center lug grooves according to an embodiment of the present technology.
Figure 4:
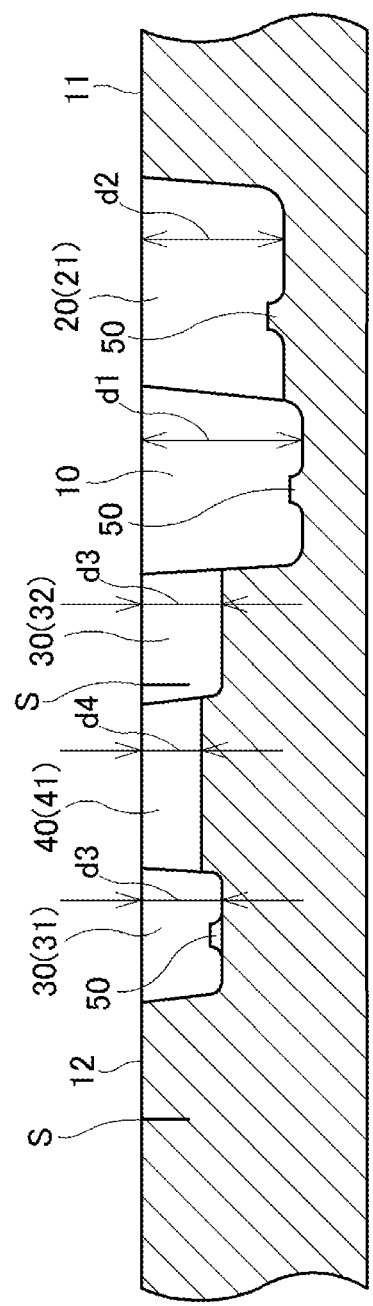
FIG. 4 is a cross-sectional view taken along line X-X in the direction of the arrow in FIG. 2.

Shoulder land portions 11 each defined outward of the main groove 10 in the tire width direction and a center land portion 12 defined between the pair of main grooves 10 are formed by the pair of main grooves 10 in the tread portion 1. As illustrated in FIGS. 2 to 4, shoulder lug grooves 20 extending in the tire width direction are formed in the shoulder land portion 11, and center lug grooves 30 extending continuously from the shoulder lug grooves 20 across the main groove 10 are formed in the center land portion 12.

Each of the shoulder lug grooves 20 includes one end communicating with the main groove 10 and the other end extending beyond the ground contact edge E, and the shoulder lug grooves 20 partition the shoulder land portion 11 into shoulder blocks 11'. The groove width and groove depth of the shoulder lug groove 20 can be equal to or smaller than those of the main groove 10. Specifically, the groove width of the shoulder lug groove 20 can preferably be set to 50% to 100% of the groove width of the main groove 10, and a groove depth d2 of the shoulder lug groove 20 can preferably be set to 80% to 100% of a groove depth d1 of the main groove 10. The shape of the shoulder lug groove 20 is not particularly limited; however, the shoulder lug groove 20 is preferably configured such that an angle with respect to the tire width direction at the ground contact edge E is, for example, 0° to 15°; and that the end communicating with the main groove 10 is curved toward the center lug groove 30 to allow the shoulder lug groove to smoothly connect to the center lug groove 30 described below. In order to further improve driving performance on unpaved roads, a sipe S and a stud pin embedding hole P may be provided in each of the shoulder blocks 11' as in the illustrated example.

Each of the center lug grooves 30 includes one end communicating with the main groove 10 and the other end terminated within the center land portion 12. The center lug grooves 30 include two types of grooves of a first center lug groove 31 and a second center lug groove 32 having different termination positions within the center land portion 12. Specifically, the first center lug groove 31 reaches the tire equator CL to be terminated thereat, and the second center lug groove 32 is terminated without reaching the tire equator CL. The first center lug groove 31 and the second center lug groove 32 are alternately disposed in the tire circumferential direction. Any of the center lug grooves 30 (the first center lug 31, the second center lug groove 32) is inclined at an angle of 45° or greater and 70° or smaller with respect to the tire width direction. In other words, an inclination angle θ1 of the first center lug groove 31 with respect to the tire width direction and an inclination angle θ2 of the second center lug groove 32 with respect to the tire width direction are 45° or greater and 70° or smaller. The groove width of the center lug groove 30 can preferably be equal to or smaller than the groove width of the main groove 10, and a groove depth d3 of the center lug groove 30 can preferably be smaller than the groove depth d2 of the shoulder lug groove 20. Specifically, the groove width of the center lug groove 30 is preferably set to 50% to 100% of the groove width of the main groove 10, and the groove depth d3 of the center lug groove 30 is preferably set to 70% to 95% of the groove depth d2 of the shoulder lug groove 20.

As described above, the shoulder lug groove 20 and the center lug groove 30 continuously extend across the main groove 10. Thus, the shoulder lug groove 20 continuously extending with the first center lug groove 31 is defined as a first shoulder lug groove 21, and the shoulder lug groove 20 continuously extending with the second center lug groove 32 is defined as a second shoulder lug groove 22. In such a case, a group of a series of grooves of the first shoulder lug groove 21 and the first center lug groove 31 (hereinafter, referred to as a "first lug groove group G1"), and a group of a series of grooves of the second shoulder lug groove 22 and the second center lug groove 32 (hereinafter, referred to as a "second lug groove group G2") are formed in the tread portion 1 of an embodiment of the present technology as indicated by the hatched portions in FIG. 3. The first lug groove group G1 and the second lug groove group G2 are alternately disposed in the tire circumferential direction. In particular, in the illustrated example, a portion of the main groove 10 extending in a zigzag pattern is inclined in the same direction as the center lug groove 30, and the portion is interposed in connection between the first shoulder lug groove 21 and the first center lug groove 31 or between the second shoulder lug groove 22 and the second center lug groove 32. Accordingly, the first lug groove group G1 or the second lug groove group G2 forms a group of grooves more smoothly connected.

In addition to the aforementioned center lug grooves 30, connecting grooves 40 are provided in the center land portion 12. The connecting grooves 40 are inclined in the opposite direction to the inclination direction of the center lug grooves 30 in the center land portion 12 to connect the center lug grooves 30. In the illustrated example, a connecting groove 41 connecting terminating end portions of the first center lug grooves 31, a connecting groove 42 connecting the first center lug groove 31 and the second center lug groove 32, and a connecting groove 43 connecting midway portions of the first center lug grooves 31 are provided. Any of the connecting grooves 40 (the connecting grooves 41 to 43) is also inclined in the opposite direction to the center lug grooves 30 (the first center lug groove 31, the second center lug groove 32). The inclination angle of the connecting groove 40 varies depending on the combination of the center lug grooves 30 to be connected, and thus the specific angle is not particularly limited. The groove width of the connecting groove 40 is preferably smaller than the groove width of the center lug groove 30, and a groove depth d4 of the connecting groove 40 is preferably smaller than the groove depth d3 of the center lug groove 30. Specifically, the groove width of the connecting groove 40 is preferably set to 40% to 65% of the groove width of the center lug groove 30, and the groove depth d4 of the connecting groove 40 is preferably set to 40% to 70% of the groove depth d3 of the center lug groove 30. Sipes S may also be provided in the center land portion 12 as in the illustrated example in order to further improve driving performance on unpaved roads.

In an embodiment of the present technology, since the shoulder lug grooves 20 and the center lug grooves 30 (the first center lug groove 31 and the second center lug groove 32) are disposed as described above, the grooves function as groups (the first lug groove group G1, the second lug groove group G2) of a series of grooves continuously extending across the land portion between each of the shoulder land portions 11, which are defined on both sides of the main grooves 10 extending in a zigzag pattern, and the center land portion 12. Further, the connecting grooves 40 inclined in the opposite direction to the center lug grooves 30 connect the center lug grooves 30 and thus complicate the configuration of the grooves in the center land portion 12. As a result, excellent traction performance and drainage performance on unpaved roads can be exerted. On the other hand, the center lug grooves 30 are formed of two types of the first center lug groove 31 and the second center lug groove 32 having different termination positions, and the first center lug groove 31 and the second center lug groove 32 are alternately disposed in the tire circumferential direction. Additionally, as described above, the configuration of the grooves in the center land portion 12 among the connecting grooves 40 is complicated, and thus pattern noise peaks are dispersed, which makes it possible to reduce noise.

In this case, when the shoulder lug groove 20 and the center lug groove 30 are discontinuous, it becomes difficult to ensure traction performance and drainage performance on unpaved roads. In a case where the connecting grooves 40 are not formed, the dispersion effect of the pattern noise peaks cannot be sufficiently obtained, and noise performance cannot be increased. In a case where the inclination angle of the center lug groove 30 deviates from the aforementioned range, the traction performance in either the tire circumferential direction or the tire width direction cannot sufficiently be ensured and the balance therebetween decreases, which makes it difficult to sufficiently improve driving performance on unpaved roads. Note that the inclination angle of the center lug groove 30 is an angle formed between the tire width direction and a straight line connecting the center in the terminating end portion of the center lug groove 30 and the center in the opening portion to the main groove 10.

In a case where the termination positions of the center lug grooves 30 do not differ and the center lug grooves 30 are formed of only one type of center lug grooves, the dispersion effect of the pattern noise peaks cannot be sufficiently obtained, and noise performance cannot be increased. Note that when the first center lug groove 31 reaches the tire equator CL to be terminated thereat, the termination position of the first center lug groove 31 is preferably within 3% to 20% of the maximum width of the center land portion 12. In addition, when the second center lug groove 32 is terminated without reaching the tire equator CL, the termination position of the second center lug groove is preferably within a range of 5% to 25% from the tire equator CL.

When the groove widths of the shoulder lug groove 20 and the center lug groove 30 are less than 50% of the groove width of the main groove 10, the groove volumes of the shoulder lug groove 20 and the center lug groove 30 cannot be sufficiently ensured, which makes it difficult to sufficiently ensure traction performance and drainage performance on unpaved roads. When the groove widths of the shoulder lug groove 20 and the center lug groove 30 exceed 100% of the groove width of the main groove 10, it is difficult to sufficiently ensure rigidity of the shoulder land portion 11 and the center land portion 12, which leads to reduction of durability. Note that in an embodiment of the present technology, the groove width of the shoulder lug groove 20 is the groove width measured at the ground contact edge E, and the groove width of the center lug groove 30 (the first center lug groove 31, the second center lug groove 32) is the groove width measured at the center position of each of the grooves in the longitudinal direction.

As described above, the groove depth $d3$ of the center lug groove 30 is preferably smaller than the groove depth $d2$ of the shoulder lug groove 20. In other words, the grooves formed in the center land portion 12 are preferably shallower than the grooves formed in the other land portions (the shoulder land portions 11). When the groove depth $d3$ of the center lug groove 30 is less than 50% of the groove depth $d2$ of the shoulder lug groove 20, the center lug groove 30 is too shallow, and thus the effect of the center lug grooves 30 cannot sufficiently be obtained (improvement of traction performance and drainage performance cannot be attained). When the groove depth $d3$ of the center lug groove 30 exceeds 95% of the groove depth $d2$ of the shoulder lug groove 20, the center lug grooves 30 is too deep, which makes it difficult to sufficiently ensure the rigidity of the center land portion 12.

When the connecting grooves 40 are inclined in the same direction as the center lug grooves 30, the dispersion effect of the pattern noise peaks are not sufficiently obtained, which makes it difficult to enhance noise performance. When the groove depth of the connecting groove 40 is greater than the groove depth of the center lug groove 30, it is difficult to sufficiently ensure the rigidity of the center land portion 12.

When the center lug groove 30 is terminated within the center land portion 12, the terminating end portion thereof is preferably formed in an acute angle shape. In other words, the center lug groove 30 preferably has a tapered shape toward the terminating end portion. For example, in the illustrated example, the side formed in the road contact surface by the terminating end surface of the center lug groove 30 is inclined with respect to the groove width direction of the center lug groove 30, and thus the center lug groove 30 is tapered toward the terminating end portion. As a result, the end shape of the center lug groove 30 is improved, which is advantageous for reducing noise. In addition, the terminating end portion of the center lug groove 30 is tapered, and thus the block rigidity can be ensured, which makes it advantageous to improve driving performance on unpaved roads. In particular, in a case where the terminating end portion of the center lug groove 30 is configured as in the illustrated example, in order to effectively attain the edge effect of the side formed in the road contact surface by the terminating end surface of the center lug groove 30, an angle formed by the side with respect to the tire rotation direction is preferably set in a range of 35°±30°.

As in the illustrated example, a protrusion portion 50 protruding from the groove bottom of the first center lug groove 31 and extending along the first center lug groove 31 is preferably provided at the groove bottom of the first center lug groove 31. When protruding from the groove bottom, the protrusion portion 50 does not occupy the entire width of the first center lug groove 31 at the portion, and the protrusion portion 50 is provided at the center of the first center lug groove 31 while being separated from the groove walls of the first center lug groove 31. The protrusion portion 50 is provided as just described, and thus the edge effect of the protrusion portion 50 can be attained, and the effect of stone biting prevention for the first center lug groove 31 can be expected. As a result, driving performance on unpaved roads is advantageously enhanced. The protrusion height of the protrusion portion 50 from the groove bottom is preferably 1 mm or greater and 5 mm or smaller. When the height of the protrusion portion 50 is less than 1 mm, there is substantially no protrusion from the groove bottom, and thus the effect of providing the protrusion portion 50 is not obtained. When the height of the protrusion portion 50 exceeds 5 mm, the protrusion portion 50 may cause the groove volume of the first center lug groove 31 to be decreased.

Such a protrusion portion 50 may be provided on the groove bottom of the main groove 10 as in the illustrated example. When provided in the main groove 10, the protrusion portion 50 protrudes from the groove bottom of the main groove 10 and extends along the main groove 10. The protrusion portion 50 does not occupy the entire width of the main groove 10 at the portion and may be provided at the center of the main groove 10 while being spaced from groove walls of the main groove 10. Even when the protrusion portion 50 is provided in the main groove 10, the edge effect of the protrusion portion 50 can be obtained. Further, the effect of stone biting prevention for the main groove 10 can also be expected. The protrusion height of the protrusion portion 50 provided in the main groove 10 can be set in the same range as provided in the aforementioned first center lug groove 31.

EXAMPLE

Sixteen types of pneumatic tires for Comparative Examples 1 to 7 and Examples 1 to 9 were manufactured. For each of the tires, the tire size is LT265/70R17 121Q. The tire has the basic structure illustrated in FIG. 1 and is based on the tread pattern of FIG. 2. The relationship between the center lug groove and the shoulder lug groove (center/shoulder lug grooves relationship), the termination position of the first center lug groove, the angle of the first center lug groove with respect to the tire width direction, the termination position of the second center lug groove, the angle of the second center lug groove with respect to the tire width direction, the presence or absence of the connecting grooves, the groove depth of the center lug grooves, the groove depth of the connecting grooves, the groove widths of the center lug groove and the shoulder lug groove (groove widths of center/shoulder lug grooves), the end shape of the center lug groove, and the presence or absence of the protrusion portion at the groove bottom of the first center lug groove are set as indicated in Tables 1 and 2.

The "center/shoulder lug grooves relationship" in Tables 1 and 2 is a row indicating whether the center lug groove and the shoulder lug groove continuously extend across the main groove. The case of continuously extending is represented as "continuous", and the case of not continuously extending is represented as "discontinuous". The "termination position of the first center lug groove" and "the termination position of the second center lug groove" in Tables 1 and 2 are rows indicating whether the terminating end portion of each of the grooves reaches the tire equator. The case where each of the grooves reaches the tire equator to be terminated thereat is expressed as "reached", and the case where each of the grooves is terminated without reaching the tire equator is expressed as "unreached". Note that in Comparative Example 3, only the center lug grooves terminated without reaching the tire equator (the second center lug grooves according to an embodiment of the present technology) are formed; however, for convenience, the "termination position of the first center lug groove" and the "termination position of the second center lug groove" are both indicated as "unreached". Similarly, Comparative Example 4 is an example in which only the center lug grooves reaching the tire equator to be terminated thereat (the first center lug grooves according to an embodiment of the present technology) are formed; however, for convenience, the "termination position of the first center lug groove" and the "termination position of the second center lug groove" are both indicated as "reached".

The "groove depth of the center lug grooves" in Tables 1 and 2 is a row indicating the size relationship of the groove depth of the center lug groove to the groove depth of the shoulder lug groove. The case where the groove depth of the center lug groove is smaller than the groove depth of the shoulder lug groove is expressed as "small", and the case where the groove depth of the center lug groove is greater than the groove depth of the shoulder lug groove is expressed as "large". The "groove depth of the connecting grooves" in Tables 1 and 2 is a row indicating the size relationship of the groove depth of the connecting groove to the groove depth of the center lug groove. The case where the groove depth of the connecting groove is smaller than the groove depth of the center lug groove is expressed as "small", and the case where the groove depth of the con-necting groove is greater than the groove depth of the center lug groove is expressed as "large". The "groove widths of the center/shoulder lug grooves" in Tables 1 and 2 is a row indicating the percentage (%) of the groove widths of the center lug groove and the shoulder lug groove to the groove width of the main groove. The "end shape of the center lug groove" in Tables 1 and 2 is a row indicating whether the terminating end portion of the center lug groove has an acute angle shape. As in the illustrated example, the case where the side formed in the road contact surface by the terminating end surface of the center lug groove is inclined (has an acute angle shape) with respect to the groove width direction of the center lug groove is expressed "acute angle", and the case where the side formed in the road contact surface by the terminating end surface of the center lug groove is not inclined (does not have an acute angle) with respect to the groove width direction of the center lug groove is expressed "perpendicular".

Noise performance and startability were evaluated by the following evaluation methods. The results are also indicated in Tables 1 and 2.

Noise Performance

The test tires were assembled on wheels having a rim size of 17×8J, inflated to an air pressure of 350 kPa, and mounted on a test vehicle (four wheel drive SUV (sport utility vehicle)), and sensory evaluations on pattern noise were performed by a test driver on a circuit of a paved road surface. Evaluation results are expressed as index values, with the value of Comparative Example 1 expressed as an index value of 100. Larger index values indicate a smaller pattern noise and superior noise performance. Note that when the index value is "104" or smaller, there is no substantial difference from Comparative Example 1 as the reference, which means that the effect of improving noise performance is not sufficiently obtained.

Startability

The test tires were assembled on wheels having a rim size of 17×8J, inflated to an air pressure of 350 kPa, and mounted on a test vehicle (four wheel drive SUV), and sensory evaluations on startability were performed by a test driver on unpaved roads (gravel road surfaces). Evaluation results are expressed as index values, with the value of Comparative Example 1 expressed as an index value of 100. Larger index values indicate superior startability on unpaved roads. Note that when the index value is "103" or smaller, there is no substantial difference from Comparative Example 1 as the reference, which means that the effect of improving startability is not sufficiently obtained.

TABLE 1

|  | Comparative Example 1 | Example 1 | Comparative Example 2 |
|---|---|---|---|
| Center/shoulder lug grooves relationship | Discontinuous | Continuous | Discontinuous |
| Termination position of first center lug groove | Unreached | Reached | Reached |
| Angle of first center lug groove ° | 50 | 50 | 50 |
| Termination position of second center lug groove | Unreached | Unreached | Unreached |
| Angle of second center lug groove ° | 50 | 50 | 50 |
| Presence/absence of connecting grooves | No | Yes | Yes |
| Groove depth of center lug grooves | Small | Small | Small |
| Groove depth of connecting grooves | Small | Small | Small |

TABLE 1-continued

|  |  |  |  |  |
|---|---|---|---|---|
| Groove widths of center shoulder lug grooves | % | 75 | 75 | 75 |
| End shape of center lug groove |  | Acute angle | Acute angle | Acute angle |
| Presence/absence of protrusion portion |  | No | Yes | Yes |
| Noise performance | Index value | 100 | 110 | 104 |
| Startability | Index value | 100 | 110 | 101 |

|  |  | Comparative Example 3 | Comparative Example 4 | Comparative Example 5 |
|---|---|---|---|---|
| Center/shoulder lug grooves relationship |  | Continuous | Continuous | Continuous |
| Termination position of first center lug groove |  | Unreached | Reached | Reached |
| Angle of first center lug groove | ° | 50 | 50 | 40 |
| Termination position of second center lug groove |  | Unreached | Reached | Unreached |
| Angle of second center lug groove | ° | 50 | 50 | 40 |
| Presence/absence of connecting grooves |  | Yes | Yes | Yes |
| Groove depth of center lug grooves |  | Small | Small | Small |
| Groove depth of connecting grooves |  | Small | Small | Small |
| Groove widths of center/shoulder lug grooves | % | 75 | 75 | 75 |
| End shape of center lug groove |  | Acute angle | Acute angle | Acute angle |
| Presence/absence of protrusion portion |  | Yes | Yes | Yes |
| Noise performance | Index value | 102 | 102 | 108 |
| Startability | Index value | 102 | 102 | 103 |

|  |  | Example 2 | Example 3 | Comparative Example 6 |
|---|---|---|---|---|
| Center/shoulder lug grooves relationship |  | Continuous | Continuous | Continuous |
| Termination position of first center lug groove |  | Reached | Reached | Reached |
| Angle of first center lug groove | ° | 45 | 70 | 75 |
| Termination position of second center lug groove |  | Unreached | Unreached | Unreached |
| Angle of second center lug groove | ° | 45 | 70 | 75 |
| Presence/absence of connecting grooves |  | Yes | Yes | Yes |
| Groove depth of center lug grooves |  | Small | Small | Small |
| Groove depth of connecting grooves |  | Small | Small | Small |
| Groove widths of center/shoulder lug grooves | % | 75 | 75 | 75 |
| End shape of center lug groove |  | Acute angle | Acute angle | Acute angle |
| Presence/absence of protrusion portion |  | Yes | Yes | Yes |
| Noise performance | Index value | 109 | 109 | 108 |
| Startability | Index value | 105 | 105 | 103 |

TABLE 2

|  | Comparative Example 7 | Example 4 | Example 5 |
|---|---|---|---|
| Center/shoulder lug grooves relationship | Continuous | Continuous | Continuous |
| Termination position of first center lug groove | Reached | Reached | Reached |

TABLE 2-continued

|  |  |  |  |  |
|---|---|---|---|---|
| Angle of first center lug groove | ° | 50 | 50 | 50 |
| Termination position of second center lug groove |  | Unreached | Unreached | Unreached |
| Angle of second center lug groove | ° | 50 | 50 | 50 |
| Presence/absence of connecting grooves |  | No | Yes | Yes |
| Groove depth of center lug grooves |  | Small | Large | Small |
| Groove depth of connecting grooves |  | Small | Small | Large |
| Groove widths of center/shoulder lug grooves | % | 75 | 75 | 75 |
| End shape of center lug groove |  | Acute angle | Acute angle | Acute angle |
| Presence/absence of protrusion portion |  | Yes | Yes | Yes |
| Noise performance | Index value | 103 | 109 | 109 |
| Startability | Index value | 103 | 108 | 108 |

|  |  | Example 6 | Example 7 | Example 8 | Example 9 |
|---|---|---|---|---|---|
| Center/shoulder lug grooves relationship |  | Continuous | Continuous | Continuous | Continuous |
| Termination position of first center lug groove |  | Reached | Reached | Reached | Reached |
| Angle of first center lug groove | ° | 50 | 50 | 50 | 50 |
| Termination position of second center lug groove |  | Unreached | Unreached | Unreached | Unreached |
| Angle of second center lug groove | ° | 50 | 50 | 50 | 50 |
| Presence/absence of connecting grooves |  | Yes | Yes | Yes | Yes |
| Groove depth of center lug grooves |  | Small | Small | Small | Small |
| Groove depth of connecting grooves |  | Small | Small | Small | Small |
| Groove widths of center/shoulder lug grooves | % | 50 | 100 | 0 | 0 |
| End shape of center lug groove |  | Acute angle | Acute angle | Perpendicular | Acute angle |
| Presence/absence of protrusion portion |  | Yes | Yes | Yes | No |
| Noise performance | Index value | 107 | 109 | 109 | 110 |
| Startability | Index value | 107 | 109 | 110 | 109 |

As can be seen from Tables 1 and 2, any of Examples 1 to 9 has effectively-improved noise performance and startability compared with Comparative Example 1. In addition, only the startability on gravel road surfaces was evaluated. However, even in the case of driving on other unpaved roads (mud roads, rocky areas, snowy roads, and the like), the tire according to an embodiment of the present technology effectively works for mud, rocks, snow, and the like on road surfaces and thus can exert excellent startability on any types of unpaved roads.

On the other hand, in Comparative Example 2, the center lug groove and the shoulder lug groove do not continuously extend, and thus the effect of improving startability is not sufficiently attained. In Comparative Example 3, since all of the center lug grooves are terminated without reaching the tire equator, the groove volume is not ensured. Thus, the effect of improving startability is not sufficiently attained. Additionally, variations of the pattern of the center land portion are reduced, and thus the effect of improving noise performance is not sufficiently attained. In Comparative Example 4, since all of the center lug grooves reach the tire equator to be terminated thereat, rigidity of the land portion is not ensured, and thus the effect of improving startability is not sufficiently attained. Additionally, variations of the pattern of the center land portion are reduced, and thus the effect of improving noise performance is not sufficiently attained. In Comparative Examples 5 and 6, the inclination angle of the center lug groove is inappropriate, and thus the effect of improving startability is not sufficiently attained. In Comparative Example 7, since no connecting groove is included, the groove volume is not ensured, and thus the effect of improving startability is not sufficiently attained. Additionally, the pattern of the center land portion is simplified, and the effect of improving noise performance is not sufficiently attained.

The invention claimed is:
1. A pneumatic tire, comprising:
a tread portion extending in a tire circumferential direction and having an annular shape;
a pair of sidewall portions disposed on both sides of the tread portion; and
a pair of bead portions disposed inward of the pair of sidewall portions in a tire radial direction, wherein the tread portion comprises: a pair of main grooves extending on both sides of a tire equator in a zigzag pattern along the tire circumferential direction; a center land portion defined on the tire equator by the pair of main grooves; and shoulder land portions defined outward of the pair of main grooves in the tire width direction, shoulder lug grooves extending in the tire width direction are formed in each of the shoulder land portions, center lug grooves continuously extending from the shoulder lug grooves across each of the main grooves and inclined at an angle of 45° or greater and 70° or smaller with respect to the tire width direction are formed in the center land portion, the center lug grooves comprise: a first center lug groove that crosses the tire equator to be terminated thereat; and a second center lug groove that is terminated without reaching the tire equator, the first center lug groove and the second center lug groove being alternately disposed in the tire circumferential direction, and connecting grooves inclined in an opposite direction to an inclination direction of the center lug grooves to connect the center lug grooves are formed in the center land portion; wherein a groove depth of the connecting grooves is smaller than a groove depth of the center lug grooves; and the connecting grooves include first connecting grooves connecting terminating end portions of the first center lug groove located on both sides of the tire equator, second connecting grooves connecting the first center lug groove and the second center lug groove located on both sides of the tire equator, and third connecting grooves connecting midway portions of the first center lug groove located on both sides of the tire equator.

2. The pneumatic tire according to claim 1, wherein a width of the shoulder lug grooves is from 50% to 100% of a width of the main grooves and a width of the center lug grooves is from 50% to 100% of the width of the main grooves.

3. The pneumatic tire according to claim 1, wherein a terminating end portion of each of the center lug grooves has an acute angle shape.

4. The pneumatic tire according to claim 1, further comprising protrusion portions each disposed at a bottom of the first center lug groove, the protrusion portion protruding from the bottom of the first center lug groove and extending along the first center lug groove.

5. The pneumatic tire according to claim 1, wherein a groove depth of the center lug grooves is smaller than a groove depth of the shoulder lug grooves.

6. The pneumatic tire according to claim 5, wherein a width of the shoulder lug grooves is from 50% to 100% of a width of the main grooves and a width of the center lug grooves is from 50% to 100% of the width of the main grooves.

7. The pneumatic tire according to claim 6, wherein a terminating end portion of each of the center lug grooves has an acute angle shape.

8. The pneumatic tire according to claim 7, further comprising protrusion portions each disposed at a bottom of the first center lug groove, the protrusion portion protruding from the bottom of the first center lug groove and extending along the first center lug groove.

* * * * *